United States Patent
Linehan et al.

(10) Patent No.: US 7,020,540 B2
(45) Date of Patent: Mar. 28, 2006

(54) TEMPERATURE CONTROL

(75) Inventors: Thomas Linehan, Clarkston, MI (US); Fred Schroeder, Shelby Township, MI (US)

(73) Assignee: D-M-E Company, Madison Heights, MI (US)

( * ) Notice: Subject to any disclaimer, the term of this patent is extended or adjusted under 35 U.S.C. 154(b) by 166 days.

(21) Appl. No.: 10/846,777

(22) Filed: May 14, 2004

(65) Prior Publication Data

US 2005/0256612 A1    Nov. 17, 2005

(51) Int. Cl.
*G29G 45/00*    (2006.01)

(52) U.S. Cl. .................. 700/202; 700/201; 700/204; 700/205; 700/207; 700/210; 700/277; 700/278; 219/420; 219/427; 219/483; 219/487; 264/297.2; 264/297.3; 164/154.1; 164/154.8; 29/848; 29/849; 65/162; 156/125; 156/131

(58) Field of Classification Search ............... 700/197, 700/198, 199, 200, 201, 202, 203, 204–205, 700/207, 210, 277, 278; 219/420–427, 483–487; 169/154.1–154.8; 65/162; 264/297.2–297.3; 156/125, 231; 29/848–849

See application file for complete search history.

(56) References Cited

U.S. PATENT DOCUMENTS

| | | | | |
|---|---|---|---|---|
| 4,274,823 A | * | 6/1981 | Stanciu et al. | 425/145 |
| 4,707,310 A | * | 11/1987 | Debeaud | 264/40.6 |
| 5,397,515 A | * | 3/1995 | Searle et al. | 264/40.6 |
| 5,456,870 A | * | 10/1995 | Bulgrin | 264/40.6 |
| 5,853,631 A | * | 12/1998 | Linehan | 264/40.6 |
| 6,529,796 B1 | * | 3/2003 | Kroeger et al. | 700/202 |
| 6,935,192 B1 | * | 8/2005 | Sobek et al. | 73/861.95 |
| 2004/0076702 A1 | * | 4/2004 | Werfeli | 425/144 |
| 2005/0091021 A1 | * | 4/2005 | Gupta et al. | |

FOREIGN PATENT DOCUMENTS

| | | | | |
|---|---|---|---|---|
| FR | 2503891 | A | * | 10/1982 |
| JP | 61115108 | A | * | 6/1986 |
| JP | 63098007 | A | * | 4/1988 |

OTHER PUBLICATIONS

D-M-E Company, "SMART Series CSS-15 &CSS-30 Microprocessor-Based Temperature Controlled Module with Digital Display User's Manual", Nov. 25, 1992, pp 1-8, D-M-E Company, USA.

(Continued)

Primary Examiner—Ramesh Patel
(74) Attorney, Agent, or Firm—John W. Gregg

(57) ABSTRACT

A method and apparatus are disclosed for controlling temperature of a plant comprising plural temperature control zones, wherein an effective control parameter for a first zone for which a signal representing measured temperature is available is produced according to an algorithm relating measured temperature, a desired temperature and a control parameter associated with a device affecting temperature in the first temperature control zone, the effective control parameter is summed with an offset value representing a proportional offset of the effective control parameter of a second temperature control zone relative to the effective control parameter of the first temperature control zone and the result is applied to control a device affecting temperature in the second temperature control zone. Advantageously, the offset value comprises a fixed amount and a variable amount, the variable amount accounting for dynamic differences in temperature control characteristics of the first and second temperature control zones.

30 Claims, 5 Drawing Sheets

OTHER PUBLICATIONS

D-M-E Company, "CIM-01-01 & CIM-01-02 Computer Interface Module User's Manual", 1995, pp 1-12, D-M-E Company, USA.

PMS Systems Ltd., "User Manual for LCD Console and HRC-C Cabinet", 1997-2002, pp 1,3,4,45, PMS Systemns Ltd.

* cited by examiner

TEMPERATURE CONTROL

I. BACKGROUND OF THE INVENTION

1. Field of the Invention

This invention relates generally to temperature control of a plant having plural temperature control zones. In particular, this invention relates to controlling devices affecting temperature in temperature control zones wherein control in one or more selected zones is effected according to the effective control parameter of another zone.

2. Description of Related Art

It is known to arrange controls for devices affecting temperature of controlled plants, whether the controlled plant is equipment or a building, in plural temperature control zones. Each temperature control zone associates at least one device for affecting temperature with a control for controlling operation of the device. The number of zones and the proximity of devices from zone to zone are chosen to achieve an acceptable range of temperature variation within the temperature control zones. For example, in temperature control of injection molding equipment, it is known to provide plural temperature control zones to maintain the so-called melt at a desired temperature as it is conveyed from within the injection unit where raw material is plasticized to article defining cavities of a mold assembly. More particularly, in such equipment comprising a so-called hot runner system for conveying melt from an injection unit to mold cavities, it is known to provide plural temperature control zones within the hot runner system.

In known temperature controlled plants, it is known to provide control for a zone wherein temperature measured by a sensor associated with a zone is compared with a desired temperature for the zone to produce a control signal for devices affecting temperature within the zone. It is also known to provide temperature control for plants wherein control of devices in one or more selected zones where temperature measurements are not available is "slaved" to an effective control parameter for a temperature affecting device in a "master" zone where a temperature measurement is available. The underlying premise for such master/slave control arrangements is that elements affecting temperature of the master and slave temperature control zone(s) be sufficiently similar so that temperature in slave zones can be controlled with acceptable precision in the absence of direct temperature measurement. It is contemplated that in addition to designed master/slave arrangements chosen to reduce the number of temperature sensors used, circumstances may arise wherein measured temperature information ceases to be available for particular zones, necessitating operation in master/slave arrangements until availability of temperature measurement information is restored. Loss of temperature measurement information may arise from failure of a sensor, failure of communication between the sensor and control, or failure of control components that process sensor signals to generate measured temperature information for subsequent control processing.

It is known that because of differences in temperature control characteristics between slave zones and the master zone, use of the effective control parameter of the master zone can result in the temperature of the slave zone(s) deviating from the desired temperature. While such deviations are of no consequence in some controlled plants, they may have adverse consequences in others. A hot runner system for injection molding is an example of a controlled plant in which such deviations may have adverse consequences, potentially resulting in production of articles of unacceptable quality. Differences in temperature may arise from structural differences between the master and slave temperature control zones as well as from dynamic differences associated with operation of the plant. Examples of structural differences include differences in relative locations of heat sources within temperature control zones, differences in dimensions and/or fit-up of mechanical elements affecting heat transfer, and differences in electrical properties of devices controlled to affect temperature. Examples of dynamic differences include differences in properties of the applied primary source of energy (heat) controlled to affect temperature, and localized environmental differences affecting heat transfer, such as differences in local ambient temperature proximate the master and slave temperature control zones. Hence, a need exists to accommodate such differences to insure desired temperature control of slave zones in master/slave arrangements for temperature control.

II. SUMMARY OF THE INVENTION

It is an object of the present invention to provide improved temperature control of a plant having plural temperature control zones wherein devices affecting temperature in at least one slave temperature control zone are controlled in response to an effective control parameter for a device affecting temperature in a master temperature control zone.

It is a further object of the present invention to provide temperature control of a plant having plural temperature control zones wherein devices affecting temperature in at least one slave temperature control zone are controlled in response to (i) an effective control parameter for a device affecting temperature in a master temperature control zone and (ii) an offset value compensating for differences in temperature control characteristics between the slave temperature control zones and the master temperature control zone.

It is a still further object of the present invention to provide temperature control of a plant having plural control zones wherein devices affecting temperature in at least one temperature control zone are controlled in response to (i) an effective control parameter for a device affecting temperature in another control zone and (ii) an offset value comprising a fixed component and a variable component, the offset value compensating for differences in temperature control characteristics between the slave temperature control zones and the master temperature control zone.

Further objects and advantages of the invention shall be made apparent from the accompanying drawings and the following description thereof.

In accordance with the aforesaid objects the present invention provides a method and apparatus for controlling temperature of a plant comprising plural temperature control zones, wherein an effective control parameter for a first temperature control zone for which a signal representing measured temperature is available is produced according to an algorithm relating measured temperature, a desired temperature and a control parameter associated with a device affecting temperature in the first temperature control zone, the effective control parameter is summed with an offset value representing a proportional offset of the value of the effective control parameter of a second temperature control zone relative to the value of the effective control parameter of the first temperature control zone and the result is applied to control a device affecting temperature in the second temperature control zone.

III. BRIEF DESCRIPTION OF THE DRAWINGS

IV. DETAILED DESCRIPTION OF THE PREFERRED EMBODIMENT

The invention shall be illustrated with reference to preferred embodiments which shall be described in detail. The illustration and description of the preferred embodiments is intended only to provide information to assist in understanding of the invention. In the following description and in the appended claims, the terms "master temperature control zone" and "master zone" shall be used interchangeably with the terms "first temperature control zone" and "first zone"; and, the terms "slave temperature control zone" and "slave zone" shall be used interchangeably with "second temperature control zone" and "second zone".

Figure 1:
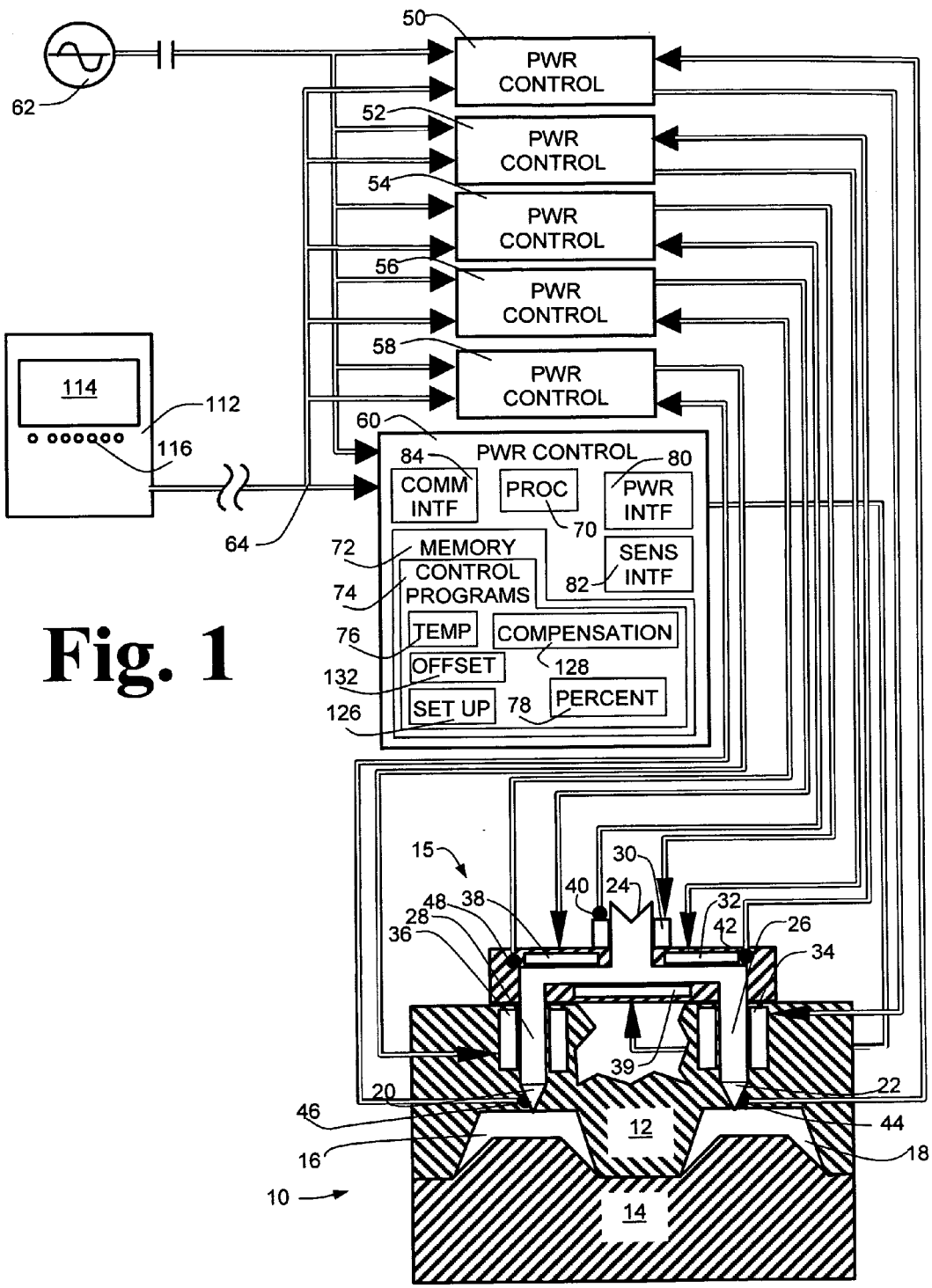
FIG. 1 is a block diagram of modular equipment having plural temperature control zones.

Referring to FIG. 1, a mold assembly 10 comprises mold halves 12 and 14 defining mold cavities 16 and 18 along the parting line of the mold halves. Mold halves 12 and 14 are shown in cross-section and mold half 12 is shown with a partial cut-away. Cavities 16 and 18 determine the shape, size and finish of articles to be molded using mold assembly 10. Molding is effected by introduction of flowable material into cavities 16 and 18 solidification of the flowable material, and separation of mold halves 12 and 14 to permit removal of the solidified articles. A hot runner system 15 comprises inlet 24, channels 26 and 28, and nozzles 20 and 22. Flowable material is introduced to hot runner system 15 at inlet 24 and is directed through channels 26 and 28 to nozzles 20 and 22 from which it enters cavities 16 and 18 of mold assembly 10. In connection with the present invention, the flowable material of interest is molten, the so-called "melt", and may be, for example, metal, rubber, or thermoplastic. Solidification of the melt may be accelerated by removal of heat from mold assembly 10 by conducting heat transfer fluid through channels (not shown) proximate cavities 16 and 18.

Continuing with reference to FIG. 1, it is to be understood that complete filling of cavities 16 and 18 is essential to producing articles of acceptable quality. Hence, it is desirable to maintain the flowable condition of the melt from inlet 24 through nozzles 20 and 22 to cavities 16 and 18. With thermoplastic material, it is necessary to control temperature of the melt within a relatively narrow range to maintain the desired flowable condition of the material without overheating to the point where degradation of components of the material will occur. Heat lost during conveyance of melt through hot runner system 15 is replaced by heat supplied from heaters 30, 32, 34, 36, 38 and 39. The arrangement of elements of hot runner system 15 is advantageously associated with temperature control zones, each temperature control zone being associated with at least one of heaters 30–39.

Continuing with reference to FIG. 1, heaters 30–39 convert electrical energy to heat. Each of controllers 50–60 are interconnected with a heater to control application of electrical energy from source 62 to one of heaters 30–39. Electrical energy from source 62 may be alternating current, as indicated in FIG. 1 or may be direct current. Advantageously, source 62 supplies poly-phase alternating current permitting distribution of electrical loads among the phases of the supply. As is well known for control of power applied to a load, controllers 50–60 advantageously include solid state switching devices that are controllably conductive to transfer electrical energy from source 62 to heaters 30–39. Regulation of the application of power may be achieved as a proportion of available energy that can be delivered by a control or in accordance with measured temperature associated with a temperature control zone. Temperature proximate the heaters is sensed by, for example, sensors 40, 42, 44, 46, and 48. Temperature sensors may be thermocouples or remote temperature detectors as are well known, and each is interconnected with the one of power controls 50–60 that control application of electrical energy to a heater having the greatest affect on the temperature sensed.

Continuing with reference to FIG. 1, each of power controls 50–60 is capable of controlling application of power according to a control algorithm relating measured temperature and a desired or set point temperature. Additionally, each of power controls 50–60 is capable of controlling application of power according to a desired or set point proportion (percentage) of the power deliverable by the control to the associated heater. When operated to deliver a percentage of available electrical power, the delivered power will be between 0% and 100% of available power deliverable by the control. As no temperature sensor is connected to power control 60 (shown connected to deliver power to heater 39), control 60 would be operated to deliver a proportion of the associated deliverable power capacity.

It is to be understood that the effective control parameters produced by power controls 50–60 vary according to the mode of control effected and activity within the zone. For example, during start-up it is desirable to add heat as rapidly as possible to bring hot runner system 15 to an operating temperature. During idle, less heat may be required from heaters 30–39 to maintain a desired temperature, particularly in systems that include equipment for rapidly removing heat from mold assembly 10 that are inactive in idle mode. In normal or automatic mode, the effective control parameter will vary according to changing activity during a normal cycle of operation. Considering hot runner system 15, melt retained in channels 26 and 28 after cavities 16 and 18 are filled, is maintained at a desired temperature primarily through addition of heat from heaters 32–39. During filling of cavities 16 and 18 flowing melt undergoes mechanical shear. producing heat, the shear and attendant heat being particularly significant in the vicinity of nozzles 20 and 22 where the cross-section narrows to the final orifice at the mold cavities and expands on entering the cavities. Shear heating significantly reduces the need for added heat from local heaters, such as heaters 34 and 36. Hence during a normal cycle of operation, the effective control parameter can vary significantly during mold filling.

Continuing with reference to FIG. 1, temperature control zones associated with power controls 52 and 56 (connected to deliver power to heaters 32 and 38, respectively) are illustrated as having substantially similar temperature affecting elements. In particular heaters 32 and 38 are located in substantially similar relative locations to inlet 24, and temperature sensors 42 and 48 are located in substantially similar relative locations to inlet 24. It is to be understood that the physical and electrical properties of heaters 32 and 38 are likewise substantially similar. Hence, although controls 52 and 56 are shown with respective connections to sensors 42 and 48, and would advantageously control application of power according to algorithms relating sensed temperature and set point temperature, either of controls 52 and 56 could be suitably controlled as a slave to the other as a master. That is, the slave power control could be suitably operated to deliver a percentage of associated deliverable power capacity wherein the percentage is determined from the actual percentage of deliverable power delivered by the master power control to maintain a desired temperature in the master temperature control zone. To this end, an effective power control signal of the master control is supplied to the slave control. The communication of effective power control signals among power controls 50–60 is facilitated by communication link 64.

In accordance with the invention, to improve temperature control for slave temperature control zones a proportional offset value is applied to each slave power control to accommodate differences in temperature control characteristics between the zone of the master control and the zone of the slave control. The proportional offset value modifies the effective power control value produced by the master control according to the following:

$$K(I)=K(M)+\text{OFF}(I) \qquad \text{equation 1}$$

Where:
　K(I) is the proportional control value of slave temperature control zone "I"
　K(M) is the proportional control value of the master temperature control
　OFF(I) is the offset proportion (positive or negative) for slave temperature control zone "I"
　I is the index differentiating temperature control zones slaved to the same master Advantageously power controls 50–60 of FIG. 1 comprise programmable devices executing programs implementing control algorithms. As an example, power control 60 is illustrated as comprising processor 70 and memory 72 wherein are stored control programs 74 including temperature control programs 76 implementing a temperature control algorithm and proportional control programs 78 implementing a proportional (percentage) power control algorithm. In addition, power control 60 comprises power interface 80 for transferring power from source 62 to the connected heater according to the effective control algorithm. Power interface 80 converts a power proportioning value produced by execution of a control algorithm to a control signal to control a power switching device to apply power to the load. Where source 62 supplies alternating current, the power switching device may control the portion of a cycle conducted by the device from the source to the load, so called phase-angle control, as is well known. Alternatively power delivered to the load may be controlled on a time interval basis wherein the power switching device conducts for a percentage of the period of a predetermined time interval. Where source 62 supplies alternating current, time interval based control advantageously delivers full cycles of alternating current during conduction, as is well known. Power control 60 further comprises sensor interface 82 for receiving signals from a temperature sensor (none connected to power control 60 as shown in FIG. 1). Additionally, power control 60 comprises communication interface 84 facilitating communication of effective control parameters between power control 60, power controls 50–58 and terminal 112. Power controls 50–58 advantageously comprise the same elements illustrated for power control 60. While shown as separate elements, processor 70 and memory 72 may comprise a single device wherein digital representations of set point values and measured temperature are used. Implementation of master/slave arrangements is facilitated with programmable devices by selection of a program implementing the control algorithm to be used. In particular, a power control for a master temperature control zone will execute a control program implementing a procedure for control responsive to measured temperature and a set point temperature. A power control for a slave temperature control zone will execute a control program implementing a procedure for control responsive to a set point proportional value regulating the power delivered to the heater. In both instances, set point values are advantageously varied according to the mode of operation of hot runner system 15.

Communication

As a consequence of variation of the effective control parameters produced by controls 50–60 of FIG. 1, where zone controls are arranged as master and slaves it is necessary to periodically update the effective control parameter used by the slave zones to insure acceptable tracking of temperature control of the slave zones relative to the master zone. Communication of effective control parameters among power controls 50–60 is effected through a communication interface, such as interface 84 of power control 60 over a communication link such as communication link 64. Communication link 64 and communication interfaces 84 advantageously implement communication in conformance with a communication standard, such as Controller Area Network Specification 2.0, Part B ("CAN 2.0B"). Communication link 64 and communication interfaces 84 provide the number of signal lines required to conform to the communication standard. It is recognized that communication conforming to any standard may be used so long as the standard implemented will support communication among the power controls at a rate sufficient to insure that variations of the effective control signal within a desired resolution is timely communicated to all temperature control zones slaved to the master zone. Advantageously, communication conforming to the CAN protocol facilitates "broadcast" of the effective control parameter of the master zone over communication link 64. In contemplation of this "broadcast" approach, communications interface 84 is provided a "filter" by which to recognize availability of effective control parameter data from its associated master at communication link 64. By this arrangement, the effective control parameter from each master zone control need only be transmitted once to be received by all associated slave zone controls. Hence, the time communication link 64 is engaged in conveying a particular value of an effective control parameter of a single master is restricted to the single broadcast irrespective of the number of slave zone controls responding to that master.

Although the application of an offset in a master/slave arrangement for temperature control has been illustrated with reference to control of electrical power delivered to heaters, the use of an offset in accordance with the invention is equally applicable to temperature control where the temperature affecting devices control, for example, flow rates of heat transfer fluids, whether liquid or gas, in heat exchanging systems. In each instance, the effective control parameter will represent a proportion of the associated capacity of the controlled device, such as a proportion of the flow rate capacity through a control valve. Flow through a valve may be controlled by, for example, controlling the relative extent to which a proportionally controllable valve is open, or by controlling the duty cycle of operation of a valve that may only be controlled to be substantially fully open or substantially fully closed. The offset value will represent a proportion effective to modify the effective control parameter to accommodate differences in the temperature control characteristics of the master temperature control zone and slave temperature control zone.

Evaluation of Offsets

As previously described, offset values define the proportional offset accommodating differences in the temperature control characteristics of slave temperature control zones relative to the associated master temperature control zone. An offset value advantageously comprises two components, a fixed amount and a variable amount. The fixed amount compensates for substantially constant differences in temperature control characteristics of the slaved temperature control zones compared to the master zone. The fixed amount is associated with structural differences between the slaved temperature control zones and the master temperature control zone. Structural differences may include differences in relative locations of elements affecting temperature, differences in heat transfer characteristics of mechanical components such as differences in size or thermal mass or differences in fit up of joined components, and differences in electrical properties of temperature affecting devices, The variable amount compensates for dynamic differences in temperature control characteristics of the master and slave temperature control zones. Dynamic differences include, for example, differences in properties of the applied primary source of energy (heat) controlled to affect temperature, and localized environmental differences affecting heat transfer, such as differences in local ambient temperature proximate the master and slave temperature control zones. Dynamic differences of the applied primary source of energy (heat) arise from, for example, residual heat of heat transfer fluid applied to a temperature control zone, and potential energy of electrical power applied to temperature affecting devices within the slaved temperature control zones.

The fixed amount of an offset value is advantageously determined from measurements of actual temperatures achieved in prospective slave zones when controlled in response to a value of an effective control parameter produced by a master zone operated to maintain a desired temperature. Temperature measurements of prospective slave zones are made manually and an offset value is adjusted to minimize the difference between the desired temperature and the actual temperature achieved in response to the value of the effective control parameter of the master control zone. Additionally, the fixed amount of an offset value may be established by a repetitive process of operation and adjustment wherein molded articles are produced while the equipment is controlled using a selected offset value. The molded articles so produced are examined to assess whether acceptable mold filling has occurred, by, for example visual inspection, weighing or measurement of dimensions of the finished articles. If inspection of those molded articles reveals insufficient mold filling, the offset is adjusted to increase temperature in the relevant zone(s). If inspection of those molded articles reveals excessive mold filling, the offset is adjusted to decrease temperature in the relevant zones. In the event a prospective slave zone includes a temperature sensor, the fixed amount of an offset value may be determined directly by comparing the effective control parameter produced by the prospective slave control when operated to maintain a desired temperature and the effective control parameter produced by the prospective master control when operated to maintain the same desired temperature.

As previously described, the variable amount of an offset value advantageously represents a difference of potential energy to be applied to the temperature affecting devices of the master and slave temperature control zones. Considering the hot runner system of FIGS. 1 and 2, the variable amount advantageously is determined in accordance with the difference of actual voltage of the power applied to the heaters of the master and slave temperature control zones. Voltage differences can arise where source 62 supplies, for example, multi-phase AC power and the heaters of the master and slave temperature control zones are supplied from different phases of source 62. As a consequence of a voltage difference, actual power in heaters of equal resistance will differ by the square of the voltage difference. Accordingly, the variable component of the offset is calculated according to:

$$V(I)=Ee(I)^2/R \qquad \text{equation 2}$$

Where:

V(I) is the variable amount of offset for slave zone I

Ee(I) is the voltage difference between electricity supply of slave zone I and electricity supply of the associated master zone R is the nominal resistance of the heater (presumed equal for slave zone and master zone)

The offset value is calculated as the sum of the fixed amount and variable amount according to:

$$OFF(I)=C(I)+V(I) \qquad \text{equation 3}$$

Where:

OFF(I) is the offset for slave temperature control zone I

C(I) is the fixed amount of the offset for slave temperature control zone I

V(I) is the variable amount of the offset for slave temperature control zone I

Primary Programmable Control

Application of the invention to a hot runner system comprising a primary programmable control shall be described with reference to the block diagram of FIG. 2. Elements of FIG. 2 corresponding to elements of FIG. 1 are shown with the same reference numbers. A programmable control 100 comprises memory 104, a processor 106, and input and output interface circuits such as power interface circuits 108, all of the foregoing interconnected by, for example, one or more busses to transfer data and addresses. An operator terminal 112 includes a display 114 and input devices such as keys 116. Operator terminal 112 permits display of data retrieved from memory 104 or created using keys 116 and entry of data to memory 104. Operator terminal 112 may be dedicated to control 100 or may be a portable device which is connected with control 100 only as needed for, for example, set up or maintenance of control 100. Processor 106 is a program controlled device which executes operating system programs 120 to effect control of devices connected to the control busses and to effect control of execution of other programs recorded in memory 104. Operating system programs 120 include mode control programs 122 which control the selection of control programs available for execution according to the operator determined mode of operation of the control, and workstation programs 124 which support exchanges of data with operator terminal 112.

Interface circuits 108 comprise, at least, plural independently controllable devices for delivering power from source 62 to heaters 30–39. Control of these devices is effected by program control effected by processor 106 executing programs, such as temperature control programs 130. Although represented in FIG. 2 by a single block, processor 106 may be a combination of plural processors, some of which serve primarily to support input and output of data between memory 104 and operator terminal 112 and others serving primarily to effect control of devices of interface circuits 108. In particular, processor 106 may include a plurality of independent processors associated with power interface circuits 108. Likewise, while memory 104 is represented in FIG. 2 by a single block, memory 104 may be a combination of plural memory devices, some of which serve primarily to store programs and data associated with functions involving operator terminal 112 and other devices serving to store programs and data associated with control of devices of interface circuits 108. In particular, memory 104 may include a plurality of independent memory devices associated with power interface circuits 108.

Program control of heaters 30–39 is effected in a "normal" or "automatic" mode of operation selected by the operator. Power applied to the heaters in this mode is controlled by execution of temperature control programs 130. Control of the hot runner system is effected by execution of, for example, a set up program 126 for establishing set point values used to control zone heating, and compensation programs 128 executing procedures to maintain zone temperatures at desired values. A source of electrical energy 62 is connected to power interface circuits 108. Power interface circuits 108 may comprise plural independent program controlled devices (combinations of processors and memory), each effecting control of electrical energy applied to one of heaters 30–38 to maintain sensed temperature within a working tolerance of the applicable temperature set point. Equivalent operation can be achieved wherein a single program controlled device (combination of memory and processor) evaluates plural algorithms and sequentially produces plural control signals, one to control power applied from source 62 to each of heaters 30–39. Irrespective of whether power interface circuits 108 comprise plural program controlled processors, each interface circuit of power interface circuits 108 advantageously comprise switching devices, advantageously solid state switching devices, which are controllably conductive to transfer electrical energy from source 62 to heaters 30–39.

To effect program control, processor 106 executes programs to evaluate control algorithms relating, for example, set point values, sensed values and controlled values. Plural algorithms may be employed to effect control of power applied to a single heater according to, for example, applicable conditions of the hot runner system. Hence, different algorithms may be employed for control under "start-up", "steady-state", and "idle" operation of any of heaters 30–39. In addition, different algorithms are employed to effect temperature responsive control using a temperature set point and sensed temperature and proportional control responsive to a proportioning set point. In accordance with the master slave arrangements contemplated by the present invention, at least one program controlled device is responsive to a temperature set point and sensed temperature as determined by one of temperature sensors 40–48, to control power applied to one of heaters 30–39. In accordance with the nature of the control algorithm used, set point values may be defined for: (i) temperatures for cold start up, normal, and idle operation; (ii) limits of electrical current delivered to the connected heater; (iii) control algorithm parameters such as gain (proportional constant), integral constants and differential constants; (iv) load resistance; (v) load power; (vi) thermal response lag time; and, (vii) average power to maintain temperature set point. Set point values are associated with each zone, each zone having a unique identifier such as a zone number. Set point data are advantageously stored to permit retrieval using an index defined by an appropriate zone identifier. As differentiated from the power controls of FIG. 1, updating of effective control parameters of slave control zones in the embodiment of FIG. 2 does not require communication among plural controls. Rather, the effective control parameter of the master zone is accessed from memory as frequently as desirable for use in updating the effective control parameters of slave zones.

Programmed Procedures

Considering the master/slave arrangement for temperature control contemplated by the present invention, set up programs 126 (FIGS. 1 & 2) permit the user to identify one or more temperature control zones as slaves to another temperature control zone as master. A procedure implemented by set up programs for establishing master/slave arrangements among temperature control zones shall be described with reference to FIG. 3. Decision step 150 represents occurrence of a user entry from operator terminal 112 indicating that a control for a zone is to be operated as a slave. At process step 152, an index I used in connection with data selection is set equal to the zone identifier (number) ZN. At process step 154 a status indicator permitting execution of a temperature control algorithm for the selected zone is set "OFF". Decision step 156 represents occurrence of a user entry identifying the temperature control zone serving as the master for the selected zone. At process step 158 an index "M" for identifying values associated with the master zone is set equal to the zone identifier (number) of the master zone "ZN(M)". While illustrated as a sequence of operator entries and processing steps in FIG. 3, the effect of steps 150 through 158 is to associate zone numbers supplied from user entries with variables used by the control processor to identify and select data identifying master and slave zones. Hence the data may be entered in any order and steps 150 and 156 are representative only of the requirement of data entries by a user. At process step 160 an array index AI for selecting values associated with master zone M is incremented. At process step 162 a pointer for the offset value for the selected zone "OFF(I)" is set equal to the index "OFF(M(AI))" identifying a location within a data array of the master zone assigned to the offset value of the selected zone. The effect of process steps 158 through 162 is to establish the location within an array of data for the offset value to be used in calculating a value of a control parameter effective to control the application of power to the heater of the selected slave temperature control zone.

Figure 2:
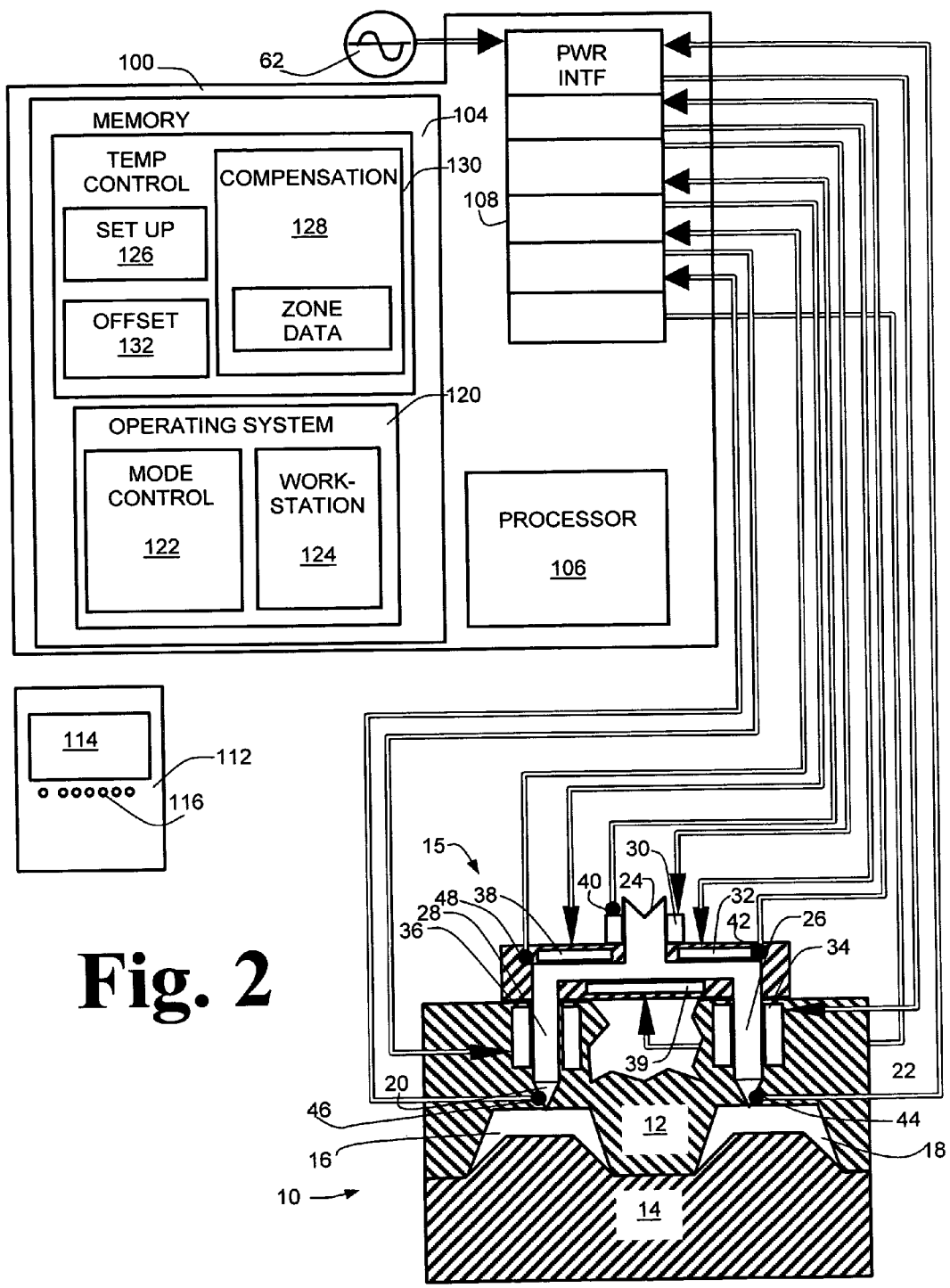
FIG. 2 is a block diagram of equipment having plural temperature control zones and comprising a primary programmable control.
Figure 3:
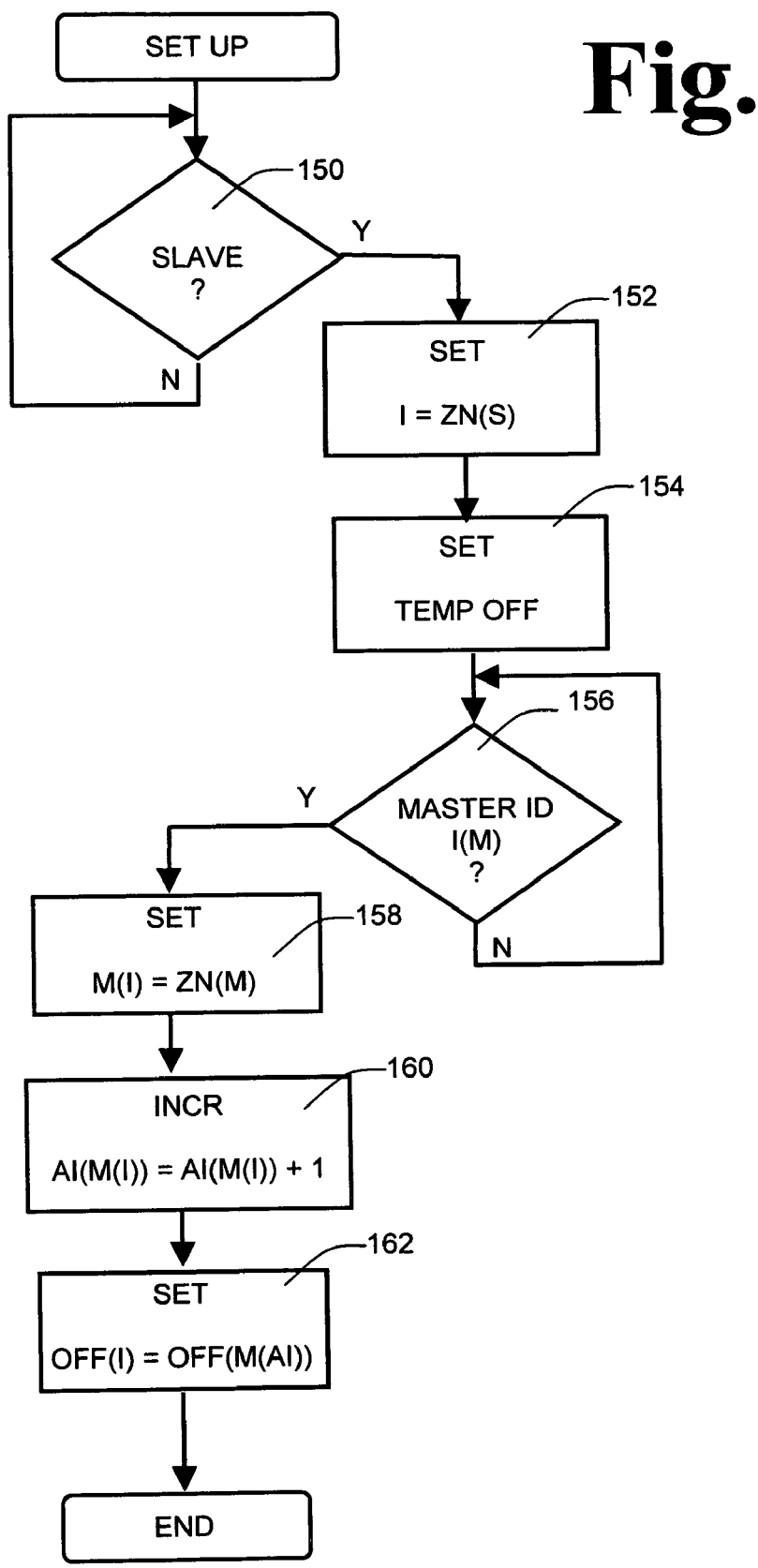
FIG. 3 is a flow chart of a procedure for establishing master/slave arrangements for temperature control

Programs for implementing evaluation of offsets are identified as offset programs 132 (FIGS. 1 & 2). A procedure for establishing values of offsets shall be described with reference to FIG. 4. At process step 170 an index "I" for selecting zones is set equal to one and an array index "AI" for selecting values from a master zone array is set equal to one. Each value of array index AI is associated with a slave zone for a particular master zone. The limit of values of array index AI for a particular master depends on the number of zones operated as slaves to that master zone. Decision step 172 determines whether the zone identified by the index I is a master zone. If so, at process step 174 an index "M" for selecting data associated with a master zone is set equal to the value of the zone selecting index I, which represents a zone number for a zone identified at decision step 172 as a master temperature control zone. At process step 176 values are calculated for the variable component of the offset of a slave zone "V(M(AI))" and the composite value of the offset for the slave zone "OFF(M(AI))". Calculation of the variable component is in accordance with equation 2 and calculation of the composite offset is in accordance with equation 3. The calculated values are associated with the location in the master zone data array selected by the array index "AI", corresponding to data for a particular zone as established by the procedure of FIG. 3. At decision step 178 it is determined whether the array index AI for the currently selected master zone is equal to its limit value. If not, the array index is incremented at process step 180 and processing continues through steps 176, 178 and 180 until it is determined at decision step 178 that the array index is equal to the limit value. Thereafter, execution continues at decision step 182 where it is determined if the zone selector index I is equal to its limit value. If not, zone selector index I is incremented at process step 184 and execution continues through steps beginning at decision step 172. Once decision step 182 determines that the zone selector index is equal to its limit value, execution of the procedure of FIG. 4 ends.

Figure 4:
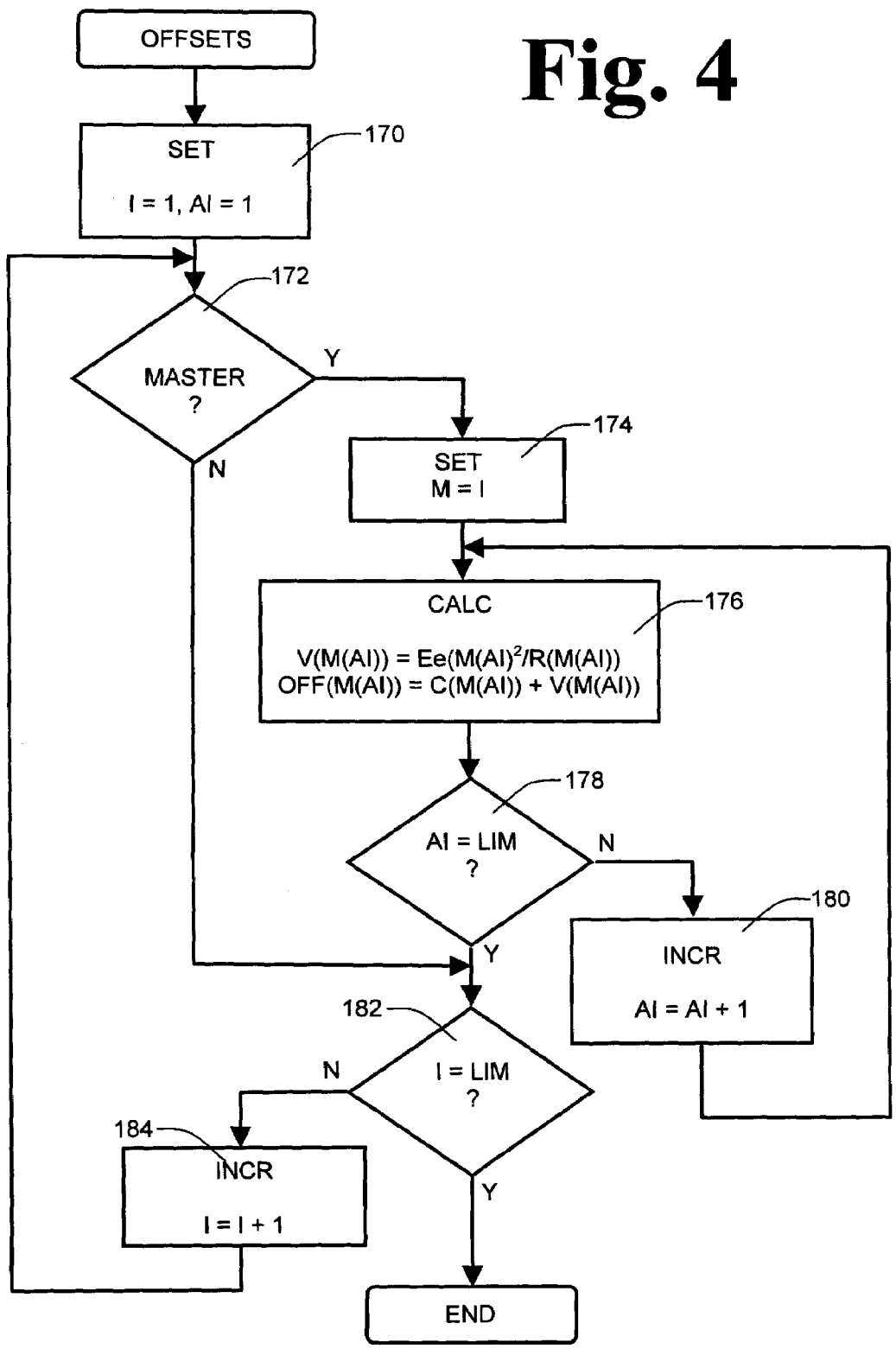
FIG. 4 is a flow chart of a procedure for evaluating proportional offsets in accordance with the invention.

Advantageously, the procedure of the flow chart of FIG. 4 is executed periodically to facilitate generation of offset values that reflect changes of parameters defining the variable component of the composite offset. In hot runner system 15 the magnitude of applied voltage for each zone is advantageously monitored to update values of voltage available for use in the calculation according to equation 2. Periodic execution of the procedure of the flow chart of FIG. 4 effects evaluation of offsets in accordance with the updated voltage values.

Programs for applying a compensating offset value to a proportional value of a slave zone are identified as compensation programs 128 (FIGS. 1 & 2). A procedure for compensating the proportioning value of a slave zone with an offset value determined with reference to the associated master zone shall be described with reference to FIG. 5. At decision step 190 it is determined whether the temperature control zone for which control is being effected is slaved to another temperature control zone. If not, execution continues at decision step 192 where it is determined whether temperature responsive control is to be effected. If so, an effective control parameter "K(I)", a proportion or percentage value defining a proportion of power required to achieve a desired temperature is calculated as a function of measured temperature "T(I)" of that zone. The function "F(T(I))" advantageously uses proportional, integral and derivative values to determined a proportion value in a so-called PID control algorithm as is well known. At process step 202 a control signal for the zone is set according to the calculated effective control parameter K(I). The control signal CMD is advantageously directly applicable to the power transferring device to control conduction to achieve the proportion represented by the effective control parameter K(I).

Figure 5:
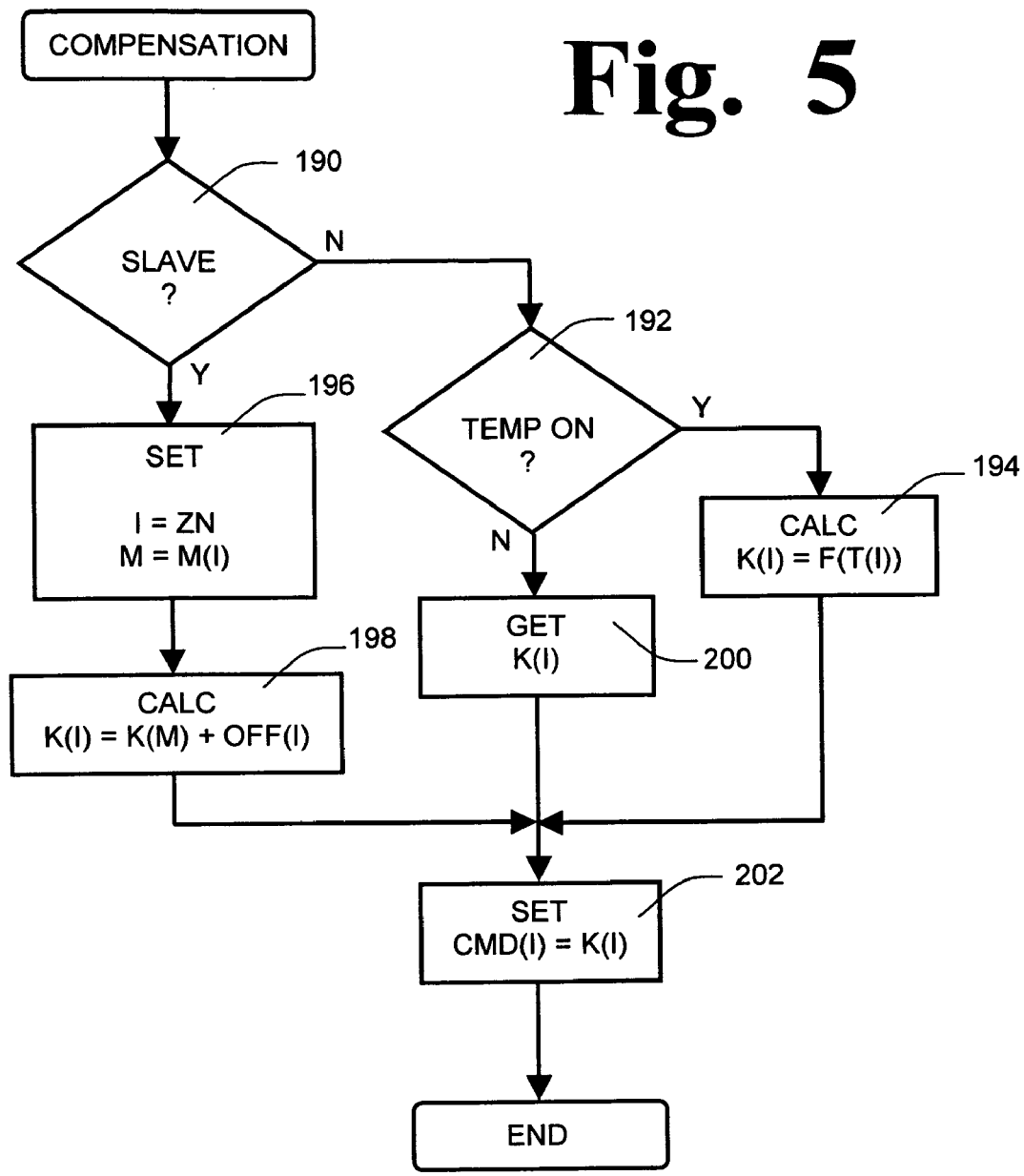
FIG. 5 is a flow chart of a procedure for compensating effective control parameters in accordance with the invention.

Continuing with reference to FIG. 5, had it been determined at decision step 192 that control was not to be effected in response to measured temperature, a proportion value set by a user is retrieved from storage at process step 202. Thereafter, the effective control signal CMD(I) is set according to the recalled effective control parameter K(I).

Had it been determined at decision step 190 of FIG. 5 that the temperature control zone of interest is slaved to a master zone, execution would continue at process step 196 where the zone selector index I is set equal to the zone identifier (number) of the slave zone and the index for selecting the master zone "M" is set equal to the zone identifier (number) of the master zone. At process step 198 the proportion value is calculated for the selected zone by summing the effective control parameter of the master zone "K(M)" with the current value of the offset for the slave zone "OFF(I)". It is to be understood that the offset value OFF(I) is retrieved from the array of data associated with master zone "M" using the array index "AI" described with reference to FIG. 4. That is OFF(I) is the value identified as OFF(M(AI)) at process step 176 of FIG. 4 where the values of "M" and "AI" correspond to the zone numbers of the particular master and slave zones. Following completion of process step 198, the control signal CMD(I) is set at process step 202 according to the proportion value K(I) calculated at process step 198. To insure temperature in the slave zones tracks temperature in the associated master zones to a desired tolerance, the compensation procedure of FIG. 5 is periodically executed using the then current values of the effective control parameters of the master zones. The frequency at which this procedure is executed is determined to accommodate the highest rate of variation of the effective control parameter of the master controls encountered in the normal cycle of operation of the hot runner system.

While the invention has been illustrated and described with reference to the preferred embodiments, it is not the intention of applicant that the invention be limited to the preferred embodiments, but rather that the invention shall be defined by the appended claims and all equivalents thereof.

What is claimed is:

1. A method for controlling temperature of a plant comprising plural temperature control zones, the method comprising:
   a) producing an effective control parameter for a first temperature control zone for which a signal representing measured temperature is available, the effective control parameter being produced according to an algorithm relating measured temperature, a desired temperature and a control parameter associated with a device affecting temperature in the first temperature control zone, the effective control parameter representing a proportion of the temperature affecting capacity of the device;
   b) summing the effective control parameter with an offset value, the offset value representing a proportional offset of the effective control parameter of at least one second temperature control zone relative to the effective control parameter of the first temperature control zone;
   c) applying the result of the summing of the effective control parameter and the offset value to control a device affecting temperature in at least one second temperature control zone.

2. The method of claim 1 wherein the offset value comprises a fixed component and a variable component and the method further comprises summing the fixed component and the variable component.

3. The method of claim 2 wherein the devices affecting temperature of the first and second temperature control zones convert electricity to heat and the effective control parameter represents a proportion of available electrical power applied to the device affecting temperature of the first temperature control zone.

4. The method of claim 3 wherein the variable component is calculated according to:

$$V=Ee^2/R$$

Where:
V is the variable amount of offset
Ee is the voltage difference between electricity supply of the second temperature control zone and electricity supply of the first temperature control zone
R is the nominal resistance of the electricity converting device.

5. The method of claim 1 wherein the devices affecting temperature of the first and second temperature control zones control flow of a heat transfer fluid and the effective control parameter represents a proportion of flow rate capacity through the flow control device of the first temperature control zone.

6. A method for controlling heating of a hot runner system comprising plural temperature control zones, the method comprising:
   a) producing an effective control parameter for a first temperature control zone for which a signal representing measured temperature is available, the effective control parameter being produced according to an algorithm relating measured temperature, a desired temperature and a control parameter associated with a heating device in the first temperature control zone, the effective control parameter representing a proportion of the heating capacity of the heating device;
   b) summing the effective control parameter with an offset value, the offset value representing a proportional offset of the effective control parameter of a second temperature control zone relative to the effective control parameter of the first temperature control zone;
   c) applying the result of the summing of the effective control parameter and the offset value to control a heating device associated with the second temperature control zone.

7. The method of claim 6 wherein the offset value comprises a fixed component and a variable component and the method further comprises summing the fixed component and the variable component.

8. The method of claim 7 wherein the heating devices of the first and second temperature control zones convert electricity to heat and the effective control parameter represents a proportion of available electrical power applied to the heating device of the first temperature control zone.

9. The method of claim 8 wherein the variable component is calculated according to:

$$V=Ee^2/R$$

Where:
V is the variable amount of offset
Ee is the voltage difference between electricity supply of the second temperature control zone and electricity supply of the first temperature control zone
R is the nominal resistance of the electricity converting device.

10. A method for controlling heating of a hot runner system comprising plural temperature control zones, the method comprising:
    a) producing an effective control parameter for a first temperature control zone for which a signal representing measured temperature is available, the effective control parameter being produced according to an algorithm relating measured temperature, a desired temperature and a power deliverable to a heater in the first temperature control zone, the effective control parameter representing a proportion of the deliverable power;
    b) summing the effective control parameter with an offset value, the offset value representing a proportional offset of the effective control parameter of a second temperature control zone relative to the effective control parameter of the first temperature control zone;
    c) applying the result of the summing of the effective control parameter and the offset value to control a heater associated with the second temperature control zone.

11. The method of claim 10 wherein the offset value comprises a fixed component and a variable component and the method further comprises summing the fixed component and the variable component.

12. The method of claim 11 wherein the variable component is calculated according to:

$$V=Ee^2/R$$

Where:
V is the variable amount of offset
Ee is the voltage difference between electricity supply of the second temperature control zone and electricity supply of the first temperature control zone
R is the nominal resistance of the electricity converting device.

13. An apparatus for controlling temperature of a plant comprising plural temperature control zones, the apparatus comprising:
    a) means for producing an effective control parameter for a first temperature control zone for which a signal representing measured temperature is available, the effective control parameter being produced according to an algorithm relating measured temperature, a desired temperature and a control parameter associated with a device affecting temperature in the first temperature control zone, the effective control parameter representing a proportion of the temperature affecting capacity of the device;
    b) means for summing the effective control parameter with an offset value, the offset value representing a proportional offset of the effective control parameter of a second temperature control zone relative to the effective control parameter of the first temperature control zone;
    c) means for applying the result of the summing of the effective control parameter and the offset value to control a device affecting temperature in the second temperature control zone.

14. The apparatus of claim 13 wherein the offset value comprises a fixed component and a variable component and the apparatus further comprises means for summing the fixed component and the variable component.

15. The apparatus of claim 14 wherein the devices affecting temperature of the first and second temperature control zones convert electricity to heat and the effective control parameter represents a proportion of available electrical power applied to the device affecting temperature of the first temperature control zone.

16. The apparatus of claim 14 further comprising means to calculate the variable component according to:

$$V=Ee^2/R$$

Where:
V is the variable amount of offset
Ee is the voltage difference between electricity supply of the second temperature control zone and electricity supply of the first temperature control zone
R is the nominal resistance of the electricity converting device.

17. The apparatus of claim 13 wherein the means for producing an effective control parameter is a first program controlled processor that periodically evaluates a control algorithm.

18. The apparatus of claim 17 wherein the means for applying the result of the summing is a second program controlled processor and the apparatus further comprises means for communication between the first program controlled processor and the second program controlled processor, the means for communication transferring the effective control parameter from the first program controlled processor to the second program controlled processor.

19. The apparatus of claim 17 wherein the means for applying the result of the summing is a second program controlled processor and the apparatus further comprises means for communication between the first program controlled processor and the second program controlled processor, the means for communication transferring the sum of the effective control parameter and the offset value from the means for summing to the second program controlled processor.

20. An apparatus for controlling heating of a hot runner system comprising plural temperature control zones, the apparatus comprising:
   a) means for producing an effective control parameter for a first temperature control zone for which a signal representing measured temperature is available, the effective control parameter being produced according to an algorithm relating measured temperature, a desired temperature and a control parameter associated with a heating device in the first temperature control zone, the effective control parameter representing a proportion of the heating capacity of the heating device;
   b) means for summing the effective control parameter with an offset value, the offset value representing a proportional offset of the effective control parameter of a second temperature control zone relative to the effective control parameter of the first temperature control zone;
   c) means for applying the result of the summing of the effective control parameter and the offset value to control a heating device associated with the second temperature control zone.

21. The apparatus of claim 20 wherein the offset value comprises a fixed component and a variable component and the apparatus further comprises means for summing the fixed component and the variable component.

22. The apparatus of claim 21 wherein the heating devices of the first and second temperature control zones convert electricity to heat and the effective control parameter represents a proportion of available electrical power applied to the heating device of the first temperature control zone.

23. The apparatus of claim 22 further comprising means to calculate the variable component according to:

$$V=Ee^2/R$$

Where:
V is the variable amount of offset
Ee is the voltage difference between electricity supply of the second temperature control zone and electricity supply of the first temperature control zone
R is the nominal resistance of the electricity converting device.

24. The apparatus of claim 20 wherein the means for applying the result of the summing is a second program controlled processor and the apparatus further comprises means for communication between the first program controlled processor and the second program controlled processor, the means for communication transferring the effective control parameter from the first program controlled processor to the second program controlled processor.

25. The apparatus of claim 20 wherein the means for applying the result of the summing is a second program controlled processor and the apparatus further comprises means for communication between the first program controlled processor and the second program controlled processor, the means for communication transferring the sum of the effective control parameter and the offset value from the means for summing to the second program controlled processor.

26. An apparatus for controlling heating of a hot runner system comprising plural temperature control zones, the apparatus comprising:
   a) means for producing an effective control parameter for a first temperature control zone for which a signal representing measured. temperature is available, the effective control parameter being produced according to an algorithm relating measured temperature, a desired temperature and a power deliverable to a heater in the first temperature control zone, the effective control parameter representing a proportion of the deliverable power;
   b) means for summing the effective control parameter with an offset value, the offset value representing a proportional offset of the effective control parameter of a second temperature control zone relative to the effective control parameter of the first temperature control zone;
   c) means for applying the result of the summing of the effective control parameter and the offset value to control a heater associated with the second temperature control zone.

27. The apparatus of claim 26 wherein the offset value comprises a fixed component and a variable component and the apparatus further comprises means for summing the fixed component and the variable component.

28. The apparatus of claim 27 further comprising means to calculate the variable component according to:

$$V=Ee^2/R$$

Where:
V is the variable amount of offset
Ee is the voltage difference between electricity supply of the second temperature control zone and electricity supply of the first temperature control zone
R is the nominal resistance of the electricity converting device.

29. The apparatus of claim 26 wherein the means for applying the result of the summing is a second program controlled processor and the apparatus further comprises means for communication between the first program controlled processor and the second program controlled processor, the means for communication transferring the effective control parameter from the first program controlled processor to the second program controlled processor.

30. The apparatus of claim 26 wherein the means for applying the result of the summing is a second program controlled processor and the apparatus further comprises means for communication between the first program controlled processor and the second program controlled processor effective control parameter and the offset value from the means for summing to the second program controlled processor.

* * * * *